United States Patent [19]

Smith

[11] Patent Number: 5,084,143

[45] Date of Patent: Jan. 28, 1992

[54] COLOR CHANGE DEVICES INCORPORATING AREAS OF CONTRASTING APPEARANCE

[75] Inventor: Gary J. Smith, Ontario, Canada

[73] Assignee: Alcan International Limited, Montreal, Canada

[21] Appl. No.: 671,948

[22] Filed: Mar. 19, 1991

[51] Int. Cl.$^5$ ............................................. C25D 11/04
[52] U.S. Cl. ..................................... 205/112; 156/233; 156/289; 428/43; 428/469; 428/916; 205/76; 205/122; 205/200; 205/322
[58] Field of Search .................. 204/3, 8, 12, 15, 37.6, 204/38.3, 42; 156/230, 233, 289; 428/201, 202, 469, 915, 916, 43

[56] References Cited

U.S. PATENT DOCUMENTS

| | | | |
|---|---|---|---|
| 4,121,003 | 10/1978 | Williams | 428/40 |
| 4,190,315 | 2/1980 | Brettle et al. | 350/96.12 |
| 4,469,725 | 9/1984 | Fischer et al. | 428/13 |
| 4,787,158 | 11/1988 | Vitol | 40/638 |
| 4,837,061 | 6/1989 | Smits et al. | 428/40 |
| 4,994,314 | 2/1991 | Rosenfeld et al. | 428/36.92 |
| 5,015,318 | 5/1991 | Smits et al. | 156/233 |

FOREIGN PATENT DOCUMENTS 817099 3/1981 U.S.S.R. .

OTHER PUBLICATIONS

L. Young, Anodic Oxide Films, Transactions Faraday Society, vol. 58, 1957, pp. 841–847.
R. E. Pawel et al, Submicron Sectioning Technique, Journal of Applied Physics, vol. 35, No. 2, Feb. 1964, pp. 435–438.
R. E. Pawel et al, Impurity Distributions in Anodic Films or Tantalum, J. Electrochem. Soc., vol. 119, No. 1, Jan. 1972, pp. 24–29.

*Primary Examiner*—John Niebling
*Assistant Examiner*—William T. Leader
*Attorney, Agent, or Firm*—Cooper & Dunham

[57] ABSTRACT

Process for producing color change devices incorporating areas of contrasting appearance, and the devices so produced. The process involves masking limited areas of a layer of a color generating metal (e.g. Ta or Nb, especially commercially sputtered Ta foil), with a mask made of a material which permits anodization of an underlying surface and permits penetration of fluoride as an adhesion-reducing agent at levels employed in the process. The masked metal layer is anodized to form an anodic film on the metal, the anodization being carried out in an electrolyte containing fluoride at a concentration high enough to (a) weaken the adhesion of the anodic film to the underlying metal over the entire area of the film, and (b) to introduce voids in the anodic film in areas not covered by the mask to reduce the density, and thus the refractive index, of the film in these areas compared to areas covered by the mask. Finally the mask is removed. The device has areas of contrasting color which form a visible pattern that disappears on detachment of the anodic film from the metal. The device can be used, for example, as a product identification code which can be made to disappear after use.

11 Claims, 3 Drawing Sheets

COLOR CHANGE DEVICES INCORPORATING AREAS OF CONTRASTING APPEARANCE

BACKGROUND OF THE INVENTION

Field of the Invention

This invention relates to a process for producing colour change devices incorporating areas of contrasting colour and to the devices thus produced.

II. Description of the Prior Art

Colour change devices are articles which exhibit a particular colour in their normal state but undergo a visible change (or loss) of the original colour when physically disturbed in some way, such as being pulled apart, punctured, bent or cut. Items of this kind are frequently used as tamper evident devices for protecting containers or packages since the visible change of colour provides an indication of tampering if the devices are used in such a way that they have to be physically disturbed for the package to be opened.

Our prior U.S. Pat. No. 4,837,061 issued on June 6, 1989 (the disclosure of which is incorporated herein by reference) relates to a basic procedure for producing colour change devices of this kind which rely on the generation of a visible colour by a light interference and absorption effect created by optically thin anodic films grown on certain metals (e.g. valve metals such as Ta and Nb, etc.). In devices of this kind, an irreversible colour change is produced when the anodic film is detached from the underlying metal and this detachment is made possible by conducting the anodization required for the growth of the film on the metal in an electrolyte containing an adhesion reducing agent, such as a fluoride. If the anodization is carried out without an adhesion reducing agent of this kind, the resulting anodic films adhere tenaciously to the underlying metal, making the required change of colour impossible to bring about.

Our patent also mentions procedures for incorporating so-called "latent indicia" into the colour change devices. Latent indicia are patterns, messages, codes, ornaments, or the like, which are invisible prior to the colour change but which become visible after the colour change has taken place. In this way, it is possible to include warnings, such as "package opened", into the devices to provide further protection. The procedures disclosed for accomplishing this require a two step anodization treatment in which the effect of the adhesion reducing agent is first masked from some areas of the metal during anodization but not from others, and then normal anodization is carried out. As a result, the anodic film is detachable from some areas of the device (resulting in a colour change) but not from others (resulting in no colour change). The resulting areas of contrasting colour form a visible pattern or message.

Our copending U.S. patent application Ser. No. 07/510,175 filed on Apr. 17, 1990 (the disclosure of which is incorporated herein by reference) relates to an improved way in which latent indicia can be introduced into colour change devices of the kind described in our prior patent. According to the improved procedure, a single anodization step can be carried out in an electrolyte containing the adhesion reducing agent after first creating the desired pattern or message on the metal using a mask which blocks the effect of the adhesion reducing agent in the areas immediately beneath the mask without otherwise affecting the formation of the anodic film beneath the mask. This results in the formation of the desired detachable and non-detachable areas of the anodic film required to produce the areas of contrasting colour when the device is activated (i.e. when the anodic film is detached).

Our further copending patent application Ser. No. 07/540,937 filed on June 20, 1990 (the disclosure of which is also incorporated herein by reference) describes a further refinement in which flexible colour change devices can be made to undergo activation (colour change) by bending rather than delamination.

While our prior patent and copending applications produce colour change devices which are extremely useful, particularly as tamper evident structures, they do not disclose ways of producing colour change devices which initially have areas of different colour that take on the same colour after activation, i.e. devices which incorporate "disappearing indicia" rather than latent indicia. It has now been found that devices of this kind have important commercial uses. For example, product identification codes are computer readable bar designs applied to almost all articles sold these days but their use creates certain disadvantages. If the codes are printed on labels applied to the articles to be sold, the labels may be fraudulently removed and adhered to other articles, e.g. articles of higher cost, before the codes are read at the point of sale. On the other hand, if the codes are printed directly onto the article to be sold or its packaging, the codes cannot be removed and remain permanently visible as unattractive markings on the article or packaging. While this latter disadvantage may not be of much concern in the case of everyday items, it is a serious disadvantage for certain high cost, decorative or fashion items, such as expensive perfumes and the like which are sold in appealing containers or packages. In such cases, it would be advantageous to make the bar codes easily removable yet non-transferable.

While colour change devices incorporating disappearing indicia offer a way of achieving this goal, as indicated above our U.S. patent and copending applications provide no method of producing such devices.

OBJECTS OF THE INVENTION

An object of the present invention is thus to provide a process for producing colour change devices which exhibit different areas of contrasting colour prior to activation of the colour change but a uniform colour after such activation.

Another object of the invention is to provide colour change devices of the above kind.

SUMMARY OF THE INVENTION

According to one aspect of the invention there is provided a process for producing a colour change device exhibiting areas of contrasting colour prior to activation but exhibiting a uniform colour after activation, which process comprises masking limited surface areas of a layer of a colour generating metal with a mask of a material which permits anodization of said limited areas; and anodizing said masked layer to form an anodic film on said metal, said anodizing step being carried out in an electrolyte containing a fluoride at a concentration high enough (a) to weaken the adhesion of the anodic film to the underlying metal over the entire area of said film, and (b) to cause the formation of voids in the anodic film in areas not covered by said mask to reduce the average density, and thus to change the average refractive index, of said areas compared to areas covered by said mask; and removing said mask from the anodic film.

According to another aspect of the invention there is provided a colour change device exhibiting areas of contrasting colour prior to activation of said colour change but exhibiting a uniform colour after said activation, said device comprising a layer of a colour generating metal; and an optically thin anodic film grown on said metal layer; said anodic film having different areas of different average density, and thus different refractive index, which exhibit different colours produced by light interference and absorption effects; and said anodic film being detachable from said metal layer in all of said different areas.

Throughout the disclosure and claims of this specification, the term "colour generating metal" means a metal which is capable of exhibiting a visible colour when subjected to anodization in a suitable electrolyte at a suitable voltage and for a sufficient time. In practice, such metals are most frequently the valve metals Ta, Nb, Zr, Hf and Ti and the refractory metals W, V and Mo.

DESCRIPTION OF THE PREFERRED EMBODIMENTS

Figure 1:
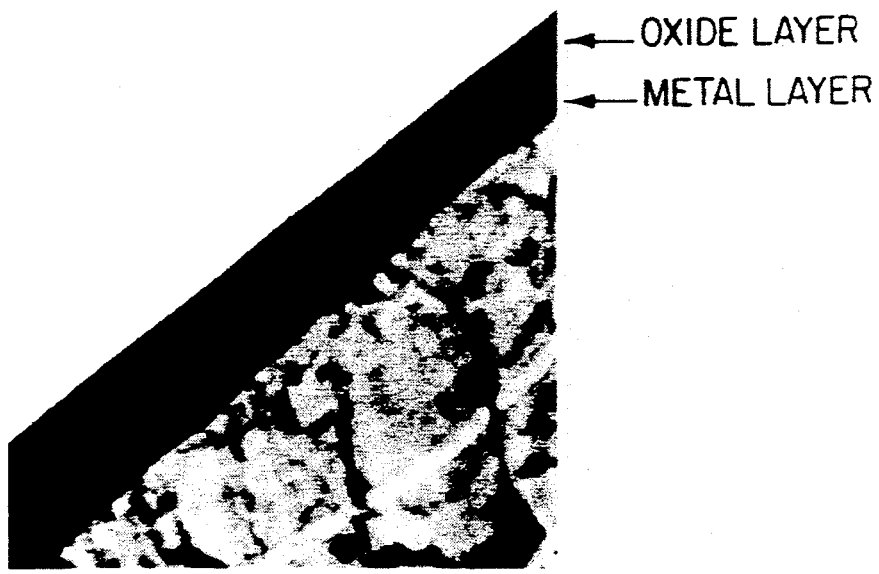
FIGS. 1 and 2 are photomicrographs of oxide films produced without and with, respectively, the presence of high concentrations of fluoride, the magnification being 60,000 X in each case.

The phenomenon of colour generation which occurs in devices of this kind is explained fully in our patent mentioned above but, briefly, the colour is generated by light interference and absorption effects. Light incident on the transparent anodic film is partially reflected from the outer surface and partially transmitted through the film itself. When the transmitted part of the light encounters the underlying metal, some of the light is absorbed and the remainder is reflected. The light reflected from the outer surface of the anodic film and the light reflected from the underlying metal interferes when the anodic film is "optically thin" (i.e. in the order of a few wavelengths of the incident light) and a colour is visible. However, the colour generation relies on an intimate association of the anodic film and the metal at the interface and, if this is destroyed, the generated colour disappears and cannot be restored by pressing the layers together again because air molecules intervene. The colour which is generated in devices of this kind depend on the identity of the metal, the thickness of the anodic film and the refractive index of the film. For any given colour generating metal, the generated colour usually depends only on the thickness of the transparent film because the refractive index of the anodic oxide film is normally invariable. However, the inventor has now found a procedure for varying the average refractive index of the film over different areas of a device so that different colours can be exhibited in the different areas even when the film is of uniform thickness throughout. The present invention is based to a large extent on this finding.

The process of the present invention is superficially similar to the process of our copending application Ser. No. 07/510,175 mentioned above but there is a critical difference and the result is quite different. The process of the copending application involves anodizing a colour generating metal in an electrolyte containing an adhesion-reducing agent (fluoride) after applying a discontinuous mask to the metal surface, the mask being made of a material which allows anodization to be carried out beneath it while blocking the adhesion reducing effect of the fluoride. After anodization and removal of the mask, the resulting device has an anodic film of uniform thickness and density over its entire surface but certain areas of the film are detachable (those not covered by the mask during anodization) whereas other areas are not (those covered by the mask), so that a message or pattern corresponding to the shape of the mask becomes visible when the detachable areas of the film are removed.

In the present invention, in contrast, a similar mask is applied to the colour generating metal, but the anodization is carried out in an electrolyte containing such a high concentration of fluoride that (a) the mask is unable to prevent the adhesion reducing effect of the fluoride from occurring at the metal oxide interface beneath the mask (as well as elsewhere), and (b) a reaction occurs at the metal/oxide interface in the areas not covered by the mask (but not in the areas covered by the mask) which results in the formation of an oxide layer having voids. The voids reduce the average density of the oxide film and thus change the average refractive index of the film. Thus, when the anodization is complete and the mask has been removed, the anodic film has relatively dense regions (those covered by the mask during anodization) and relatively porous regions (those not covered), but the entire film can be detached from the underlying metal (i.e. in both the dense and the porous regions).

Figure 2:
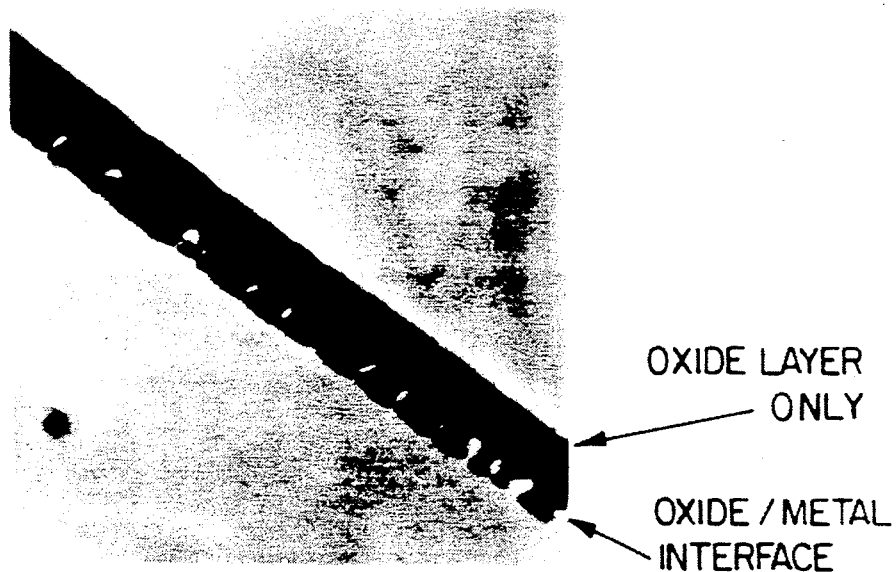

FIGS. 1 and 2 are photomicrographs showing cross sections of anodic films produced by anodizing Ta-sputtered Al foil at 110 V in citric acid alone (FIG. 1, also showing the Ta and Al layers) and in citric acid containing 250 ppm fluoride (FIG. 2, showing the oxide layer alone). It can be seen from FIG. 2 that the lower region of the oxide layer (which was positioned adjacent to the layer of colour generating metal) is porous due to the action of the high concentration of fluoride. The resulting change of average material density is sufficient to produce a marked change in the average refractive index and thus a visibly different colour from the colour generated by the oxide layer of FIG. 1.

Accordingly, the device produced by the process of the present invention, prior to detachment of the anodic film, will have different regions of contrasting colour corresponding to the shape of the mask generated by the different film densities. After detachment of the film, however, the colours of both regions will disappear and the device will assume the colour of the underlying metal (generally a silvery grey). In effect, therefore, the indicia (pattern, message, code or ornament, etc.) of the original device will have disappeared.

The process parameters of the anodization step are essentially the same as those employed in our patent and copending applications, except for the increased concentration of fluoride employed in the electrolyte, and devices which are activatable by bending as well as devices which are activatable by delamination can be produced.

The concentration of fluoride required in the present invention depends on the colour generating metal undergoing the anodization treatment. In the case of Ta, the amount of fluoride should be at least about 90 ppm but at levels above about 400 ppm, the resulting indicia start to fade in appearance. This contrasts with the levels of 30–90 ppm, or more usually 60–75 ppm, used for producing latent indicia on Ta in our copending applications.

For the sake of economy and flexibility of the resulting product, the process of the present invention is preferably carried out on thin aluminum foil substrate coated with the colour generating metal, rather than on a thick layer (e.g. a self-supporting plate) of the colour generating metal. Tantalum is the most effective colour generating metal for use in the present invention and the most preferred substrate for the anodization is commercially Ta-sputtered Al foil. Commercially Nb-sputtered Al foil is also suitable. Ta- and Nb-sputtered Al foils of this type can be purchased, for example, from Deposition Technologies Incorporated of 4540 Viewridge Avenue, San Diego, Calif., USA 92123. It seems that the commercial sputtering process introduces impurities that enhance the reaction process required to form the areas of different average density. The commercial process of producing sputtered foil begins with a large coil of the substrate foil having a protective polymer backing. The coil is placed in a large gas-tight chamber and the chamber is evacuated for 1–2 hours, sputtering is then carried out and the pressure is released. The resulting sputtered product may contain oxygen, nitrogen, water and possibly organics from residues of the polymer film. In contrast, sputtering in the laboratory is generally much cleaner because of the use of lower pressures and smaller quantities of generally purer starting materials.

The materials used for the masks in the process of the present invention can be the same as the materials used in our copending applications. These are generally non-aqueous solvent-based materials because water-based materials tend to disintegrate or partially dissolve in the aqueous anodizing bath before anodization is complete. The most effective materials are printing inks and uncured resist materials (cured resists tend to prevent anodization beneath the cured material), such as those containing polystyrene, polyamide, nitrocellulose, epoxy resins, alkyd resins, epoxy acrylates, as well as non-aqueous solvents such as methanol and methyl ethyl ketone. It therefore appears that the inks or resists should desirably contain long chain preferably cross-linkable polymer and a non-aqueous solvent, but there is no reason to exclude other materials that may be found by simple experimentation.

The polymer solutions, inks and resists used in the present invention may be applied by conventional application techniques, e.g. printing, silk screening, stamping, spraying through a mask, painting, brushing, screen painting, flexographic painting, rubbing on, etc., to produce any desirable pattern, message, code, ornamentation, etc. The material should be used at a suitable dilution to permit easy application while preventing the reaction process for the formation of voids in the anodic film from taking place beneath the masking layer. The appropriate concentrations vary according to the material employed, but can easily be found by simple trial and experimentation. Generally, concentrations suitable for normal printing or silk screening are effective, sometimes with minor variations.

Specific inks, resists and other materials which are suitable in the present invention include the following products identified by their commercial trade names:

MACUMAGE 19408—an ultra violet curable screen printing etch resist sold by MacDermid Co. containing an epoxy acrylate polymer;

R-569 ALKA-STRIP*—a screen printing etch resist sold by Advance Supply Co. containing an alkyd resin and glycol ether solvent;

A48889*—a modified nitrocellulose-based flexographic ink sold by BASF Co.;

A48893*—a polyamide-based flexographic ink sold by BASF Co.;

CR4281*—a polyamide-based flexographic ink sold by BASF Co.;

VASELINE—a petroleum jelly;

EB-157—an epoxy based screen printing ink sold by Ink Dezyne Co.;

16-8200Q—an ink jet printing ink sold by Video Jet Co. which is a complex mixture of ingredients, the major one being polystyrene, and including methanol and methyl ethyl ketone solvent systems;

16-8700Q—an ink jet printing ink sold by Video Jet Co. similar in composition to the product immediately above;

16-7800Q—an ink jet printing ink sold by Video Jet Co. again similar to the 16-8200Q product mentioned above.

[* These materials are preferably diluted (e.g. 30%) with a suitable solvent (e.g. butyl Cellosolve) to slow down their drying times. The other materials can be used without dilution.]

The thickness of the material used as the mask does not appear to play a very critical role in the observed effects and thicknesses which can easily be formed by the conventional techniques mentioned above are usually suitable. The process works with mask thicknesses of $<1$ $\mu$m to 100 $\mu$m covering the practical working range, but thicknesses outside this range may also work.

The anodizing conditions, electrolytes and colour generating metals are essentially the same as those referred to in our copending applications and also in our prior patent identified above. In most cases, the fluoride used as the adhesion reducing agent is dissolved in the electrolyte (e.g. aqueous citric acid solution) used for the anodization step, but it could also be coated on the surface of the masked colour generating metal prior to the anodization step or otherwise made present during the anodization. Anodization voltages range from a few volts up to 150 volts or so, and anodization times are generally from a few seconds to a few minutes. It is usually not possible to make the anodic film too thick because there is generally a maximum thickness beyond which the anodic films will not grow.

After the anodization has been carried out, the masking material is removed, usually simply by washing the anodized product with water, although caustic aqueous solutions (e.g. water containing 4% NaOH by weight) may be more effective, especially for the Macumage 19408 and R-569 Alka Strip resist materials.

After drying the resulting product, a thin flexible transparent or translucent sheet of polymeric material is normally adhered over the anodic film, e.g. by heat sealing or by means of a conventional adhesive. This sheet, which is often left unadhered at an edge of the device to form a graspable tab, provides a means by which the anodic film can easily by removed from the underlying metal to cause the colour change and the disappearance of the visible indicia.

The steps in the process of the invention are illustrated in the accompanying drawings.

Figure 3A:
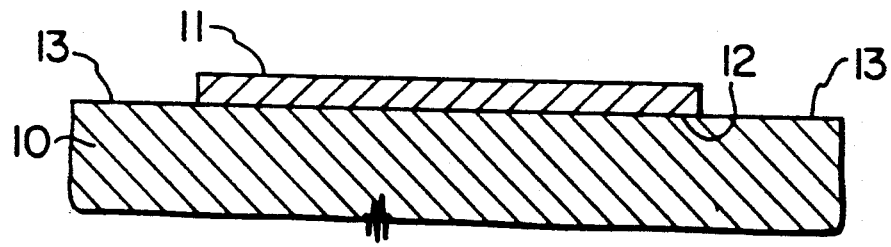
FIGS. 3(A) TO 3(E) are cross-sectional diagrams showing steps in the fabrication of a colour change device according to a preferred form of the present invention.

FIG. 3(A) shows a layer 10 of Ta (which is the outer layer of a commercially sputtered Al foil, the Al layer not being shown in the drawing). A mask layer 11 is formed on part of the Ta layer creating a covered surface area 12 and exposed surface areas 13. This layered structure is immersed in an electrolyte containing 250 ppm of F. and subjected to anodization at 120 volts for 20 seconds.

Figure 3B:
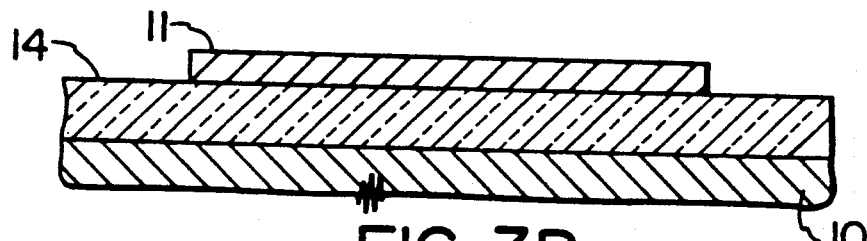
Figure 3C:
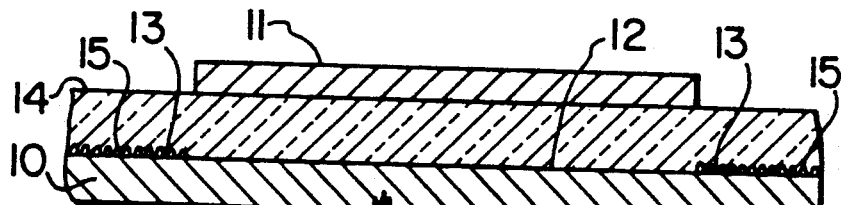

In the absence of the high concentration of fluoride, the structure produced by the anodization step would appear as shown in FIG. 3(B) with an anodic film 14 between the mask layer 11 and the unconsumed Ta of layer 10. However, as shown in FIG. 3(C), as the anodic film 14 is grown, exposed surfaces 13 are contacted by high concentrations of fluoride which causes a reaction process at the metal/oxide interface which results in the formation of voids 15 and so the anodic film 14 is more porous in these exposed regions 13 than immediately beneath the mask layer 11.

Figure 3D:
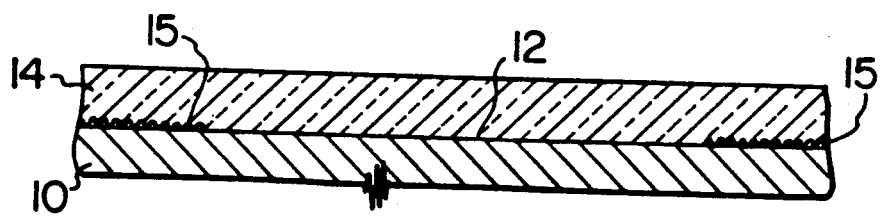

After removal of the mask layer 11 by washing or the like the structure appears as shown in FIG. 3(D). The anodic film 14 has a greater density in the regions 12 formerly masked than in the unmasked regions 13. This difference in density causes the regions 13 to exhibit a different colour from the region 12 because the differences in refractive index of the transparent anodic film 14 in the different regions affect the observed colour.

Figure 3E:
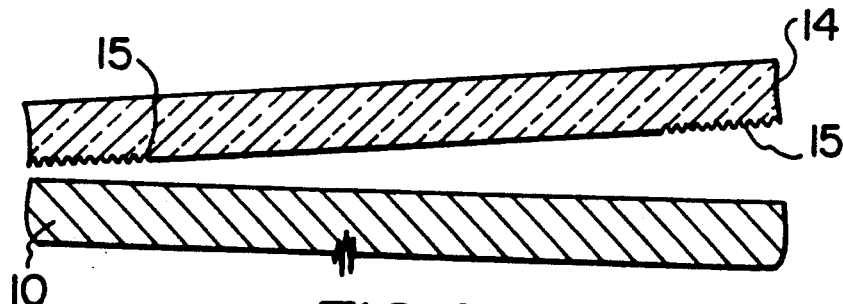

As well as introducing voids or porosity, the fluoride also weakens the attachment of the anodic film 14 to the Ta layer 10 over the entire Ta/anodic film interface. The anodic film 14 may therefore be easily detached from the Ta layer as shown in FIG. 3(E). After removal of the anodic film 14, the remaining structure has the appearance of the underlying metal 10 and consequently the original colours and indicia disappear. Attempts to regenerate the original colours and indicia fail because the colour generation requires an intimate bond to be formed at the interface of the anodic film 14 and the Ta layer 10 and this cannot be achieved because of intervening air molecules.

Although not shown in the drawings, the anodic film 14 can be covered by an adhering transparent or translucent polymer sheet to facilitate the detachment represented in FIG. 3(E).

The device can be fabricated in this way to form a product identification code (bar code) with the denser portions 12 forming the bars. The device then has a series of visible bars against a background of a different colour. The bar code can be read by computer equipment to reveal information about a product, following which the anodic film can be detached to cause the bar code and background colour to disappear.

Figure 4:
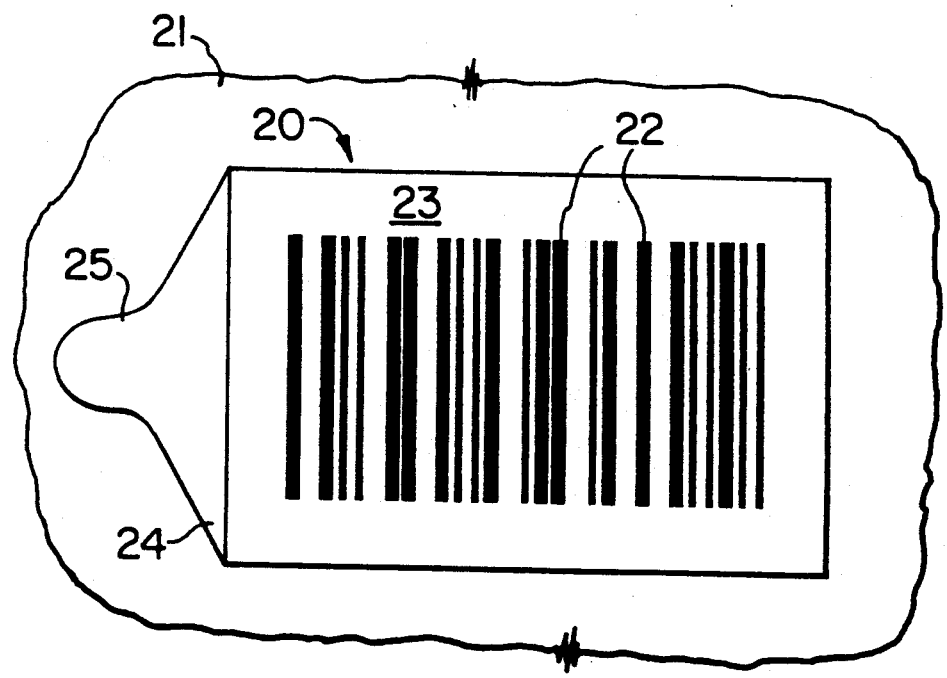
FIG. 4 is a plan view of a label incorporating a colour change device according to one form of the present invention.
Figure 5:
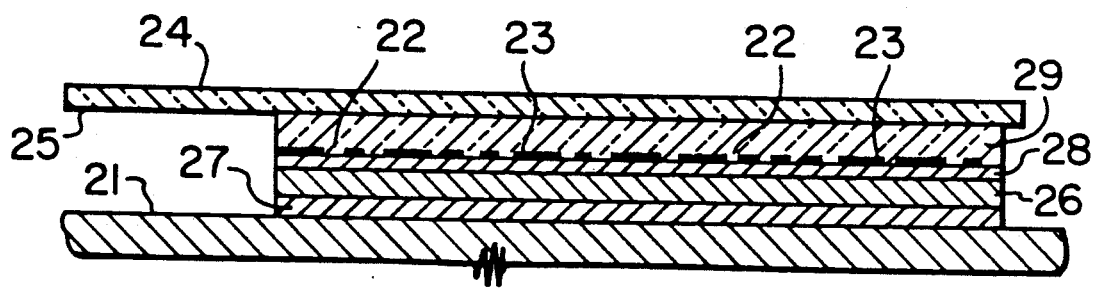
FIG. 5 is a cross section of the label of FIG. 4.

FIGS. 4 and 5 show a label incorporating a bar code of this type. FIG. 4 is a plan view showing a rectangular label 20 attached to an article 21. A series of bars 22 forming a product identification code is visible against a background 23 of contrasting colour. The label is covered with a flexible transparent plastic sheet 24 which extends beyond the label at one end to form a graspable tab 25.

In the cross section of FIG. 5, it can be seen that the label consists of a layer of aluminum foil 26 attached to the article 21 by an adhesive layer 27. The aluminum foil layer supports a thin layer of commercially sputtered Ta 28 which in turn supports a thin anodic film 29. The film 29 has denser regions forming the bars 22 of the code and porous regions forming the contrasting background 23. The plastic sheet 24 is adhered over the film 29.

Prior to activation of the device, the bar code 22 is visible and the information can be read by a computer in the normal way. After the information has been retrieved, the tab 25 may be grasped and the plastic sheet 24 peeled back to detach the anodic film 29 from the tantalum 28 over the entire area of the film leaving a rectangle having a uniform metallic appearance.

As indicated above, the devices produced by the process of the present invention are usually activatable by bending as well as by peeling, cutting, puncturing, etc., in which case the product code will disappear if the entire label 20 is peeled from the article 21. Accordingly, if an attempt is made to transfer the label 20 to another item, the product code will not be visible and readable when the article with the improper label is taken to the point of sale.

The invention is illustrated in more detail below with reference to the following Examples.

EXAMPLE 1

A commercially Ta-sputtered Al foil was screen printed with a bar code pattern and then anodized for 30 seconds at 120 V in citric acid doped with 120 ppm of fluoride. The result was a blue bar code on a reddish copper background.

Detachment of the anodic film caused the pattern to disappear leaving a surface having a metallic grey colour.

EXAMPLE 2

The procedure of Example 1 was repeated except that the foil was anodized for 20 seconds at 125 V in citric acid doped with 250 ppm fluoride.

The result was a blue bar code on a yellow background.

EXAMPLE 3

The procedure of Example 1 was repeated except that the foil was anodized for 20 seconds at 125 V in citric acid doped with 150 ppm fluoride.

The result was a blue bar code on a copper background.

EXAMPLE 4

The procedure of Example 1 was repeated except that the foil was anodized for 20 seconds at 140 V in citric acid doped with 250 ppm fluoride. The result was a green bar code on a copper background.

EXAMPLE 5

Tantalum sputtered foil produced on a commercial continuous web sputter machine at Deposition Technologies Inc. was used to determine the lowest levels of fluoride that can be used to generate the required background contrast for visibility of a pattern before activation (detachment of the anodic film) and the disappearance of the pattern after activation.

The results are shown in Table 1 below:

TABLE 1

| VOLTAGE | FLUORIDE LEVEL | MESSAGE COLOUR | BACKGROUND COLOUR |
|---|---|---|---|
| 110 V | 120 ppm | Wine | Pink |
| 120 V | 120 ppm | Blue | Pink |
| 140 V | 90 ppm | Green | Grey-Blue |

At levels in the range between the above values and the upper limits for labels activatable by bending, messages are less visible and may not disappear after activation by bending or peeling.

Upper limits have a broad range since sensitivity and colour contrast increase with fluoride level. They should be no higher than that required to produce a suitable effect. It should also be noted that the upper limit may be limited by message colour development. For example, with samples anodized at a fluoride level of 400 ppm, it was found that the messages were quite pale and did not anodize to the desired colour.

What I claim is:

1. A process for producing a colour change device exhibiting areas of contrasting colour prior to activation but exhibiting a uniform colour after activation, which process comprises:
    masking limited surface areas of a layer of a colour generating metal with a mask of a material which permits anodization of said limited areas;
    anodizing said masked layer to form an anodic film on said metal, said anodizing step being carried out in an electrolyte containing a fluoride at a concentration high enough (a) to weaken the adhesion of the anodic film to the underlying metal over the entire area of said film, and (b) to cause the formation of voids in the anodic film in areas not covered by said mask to reduce the average density, and thus to change the average refractive index, of said areas compared to areas covered by said mask; and
    removing said mask from the anodic film.

2. A process according to claim 1 wherein said colour generating metal is Ta.

3. A process according to claim 2 wherein said layer of Ta is an outer layer of a commercially sputtered Ta foil.

4. A process according to claim 2 wherein said concentration of fluoride is in the range of 90–400 ppm.

5. A process according to claim 1 wherein said anodic film, following removal of said mask, is covered with an adhering sheet of flexible transparent material.

6. A colour change device incorporating areas of contrasting appearance, produced by a process according to claim 1.

7. A colour change device exhibiting areas of contrasting colour prior to activation of said colour change but exhibiting a uniform colour after said activation, said device comprising:
    a layer of a colour generating metal; and
    an optically thin anodic film grown on said metal layer;
    said anodic film having different areas of different average density and thus different refractive index, which exhibit different colours produced by light interference and absorption effects;
    and said anodic film being detachable from said metal layer in all of said different areas.

8. A device according to claim 7 wherein said colour generating metal is tantalum.

9. A device according to claim 7 wherein said colour generating metal is tantalum commercially sputtered onto Al foil.

10. A device according to claim 7 wherein said areas of different density form a series of bars capable of being read by a computer as a product identification code.

11. A computer-readable label comprising:
    a layer of a colour generating metal; and
    an optically thin anodic film grown on said metal layer;
    said anodic film having different areas of different average density, and thus different refractive index, arranged in a pattern of computer-readable bars, said areas of different density exhibiting different colours produced by light interference and absorption effects;
    and said anodic film being detachable from said metal layer in all of said different areas.

* * * * *